United States Patent [19]

Hendrischk et al.

[11] Patent Number: 5,091,829
[45] Date of Patent: Feb. 25, 1992

[54] HEADLAMP FOR A MOTOR VEHICLE

[75] Inventors: Wolfgang Hendrischk, Soest; Franz Kathmann, Lippstadt, both of Fed. Rep. of Germany

[73] Assignee: Hella KG Hueck & Co., Lippstadt, Fed. Rep. of Germany

[21] Appl. No.: 693,585

[22] Filed: Apr. 30, 1991

[30] Foreign Application Priority Data

Apr. 30, 1990 [DE] Fed. Rep. of Germany ....... 4013893

[51] Int. Cl.⁵ .............................................. B60Q 1/00
[52] U.S. Cl. ..................................... 362/61; 362/66; 362/273; 362/427
[58] Field of Search ................ 362/61, 66, 80, 269, 362/273, 420, 421, 422, 423, 427, 428

[56] References Cited

U.S. PATENT DOCUMENTS

| 4,731,707 | 3/1988 | McMahon et al. | 362/61 |
| 4,733,333 | 3/1988 | Shibata et al. | 362/40 |
| 5,032,964 | 7/1991 | Endo et al. | 362/66 |

FOREIGN PATENT DOCUMENTS

| 0023851 | 2/1981 | European Pat. Off. . |
| 0006569 | 6/1982 | European Pat. Off. . |
| 0138217 | 1/1988 | European Pat. Off. . |
| 3028892A1 | 2/1981 | Fed. Rep. of Germany . |
| 3235317C1 | 1/1984 | Fed. Rep. of Germany . |

OTHER PUBLICATIONS

German Patent Office Search Report.
German Auslegeschrift 1006738, Apr. 18, 1957.
German Gebrauchmuster 89 10 911, Nov. 30, 1989.
German Gebrauchmuster 70 16 497, Apr. 27, 1970.

Primary Examiner—Ira S. Lazarus
Assistant Examiner—Sue Hagarman
Attorney, Agent, or Firm—Griffin Branigan & Butler

[57] ABSTRACT

A headlamp includes an adjusting mechanism for adjusting a reflector (3) of the headlamp about at least one axis (8). The adjusting mechanism comprises a threaded nut (9) attached to the reflector and a threaded shaft (12) which is rotatably mounted on a stationary part (1) of the headlamp. Adjustment of the reflector is displayed by a scale-like indicator mechanism which includes a fixed part (24) and an adjustable part (15). According to the invention, the adjustable part is formed of an idling toothed wheel (15) that meshes with a pinion (21) of the threaded shaft but which can be disengaged therefrom by axial displacement of the toothed wheel.

10 Claims, 3 Drawing Sheets

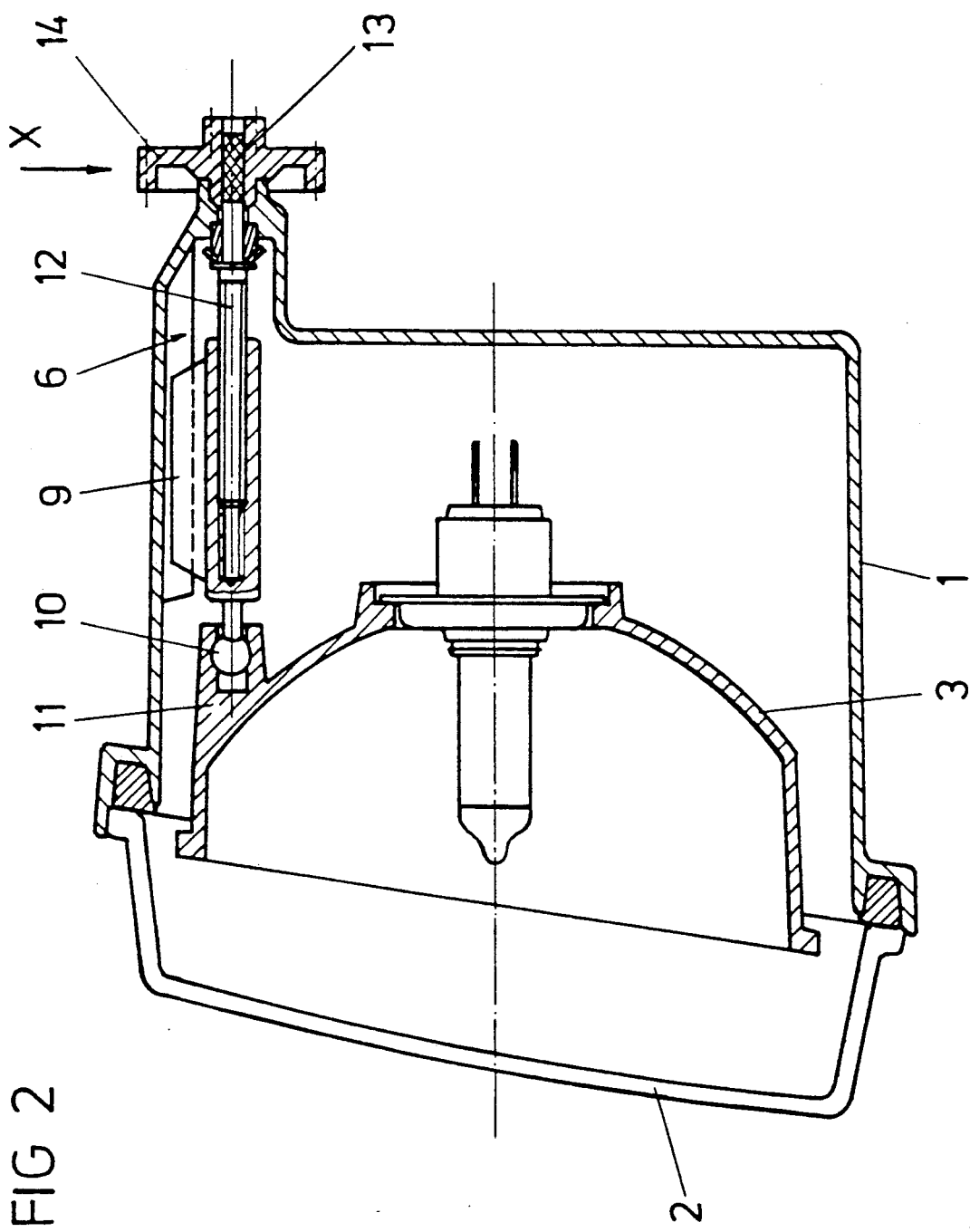

HEADLAMP FOR A MOTOR VEHICLE

BACKGROUND OF THE INVENTION

This invention relates to a headlamp for motor vehicles of a type including a reflector pivotally adjustable about at least one axis by means of an adjusting device which comprises mainly a threaded nut fastened to the reflector and a threaded shaft, or bolt, rotatably mounted in a fixed (or stationary) part of the headlamp but not being substantially displaceable in an axial direction, and also comprising a scale-like indicating mechanism for indicating the position of the pivotable reflector comprising a stationary part and a moveable part.

Such a headlamp is disclosed in German Auslegeschrift 1 006 738. In order to mount a reflector of this prior art headlamp in an intended position for installation of the headlamp in a motor vehicle, marking lines (or indicia) are provided on edges of a longitudinal slit in a fixed portion of the headlamp. This scale-like indicating apparatus is not suitable however to make a quick inspection as to whether the reflector of a headlamp installed in a motor vehicle is in a proper position. In this regard, it is necessary to have an adjusting mechanism which after the reflector has been adjusted can be reset to a particular value, for example, to an adjusting value of "zero" (0), so that an inspector can remember a particular value, possibly different for each headlamp, in which the reflector takes up a proper position. Such indicating mechanisms are known, for example, from German Gebrauchmuster 89 10 911. Here a bubble level is used which shows whether a reflector has a proper angular slant, or displacement, from vertical. With this adjusting, or indicating, mechanism, it can be inspected if exiting light has a proper inclination to planes of driving lanes.

In German Gebrauchmuster 70 16 497 an indicating mechanism is disclosed having two bubble levels. One of the levels functions as described above, that is, it indicates the reflector position in the vertical direction, while the second level displays the reflector adjustment in the horizontal direction, and no doubt a pivoting of the reflector about an optical axis of the reflector. Because motor vehicle headlamps normally have no adjusting mechanisms with which reflectors can be adjusted about their own optical axes, this inspection possibility is less helpful.

It is therefore an object of this invention to provide an indicating mechanism with which an uncomplicated visual inspection can determine if a reflector is properly adjusted with regard to horizontal pivoting, that is, to make possible an inspection as to whether the optical axis of the reflector runs parallel to a vertical middle plane of a motor vehicle on which the reflector is mounted. In addition, this indicating mechanism should be so formed that it can be simply and quickly placed at a new value, for example at zero value, after each adjustment of the reflector.

SUMMARY OF THE INVENTION

According to principles of this invention, an adjustable, or moveable, part of the indicating mechanism is formed of an idling toothed wheel that meshes with a pinion of a threaded shaft and which can be disengaged therefrom by axial displacement of the toothed wheel.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a vertical cross-sectional view of a headlamp including the reflector of FIG. 1 taken on line I—I in FIG. 1, said reflector including an adjusting device in FIG. 1, said reflector including an adjusting device having an indicating mechanism of this invention;

DESCRIPTION OF A PREFERRED EMBODIMENT

Figure 1:
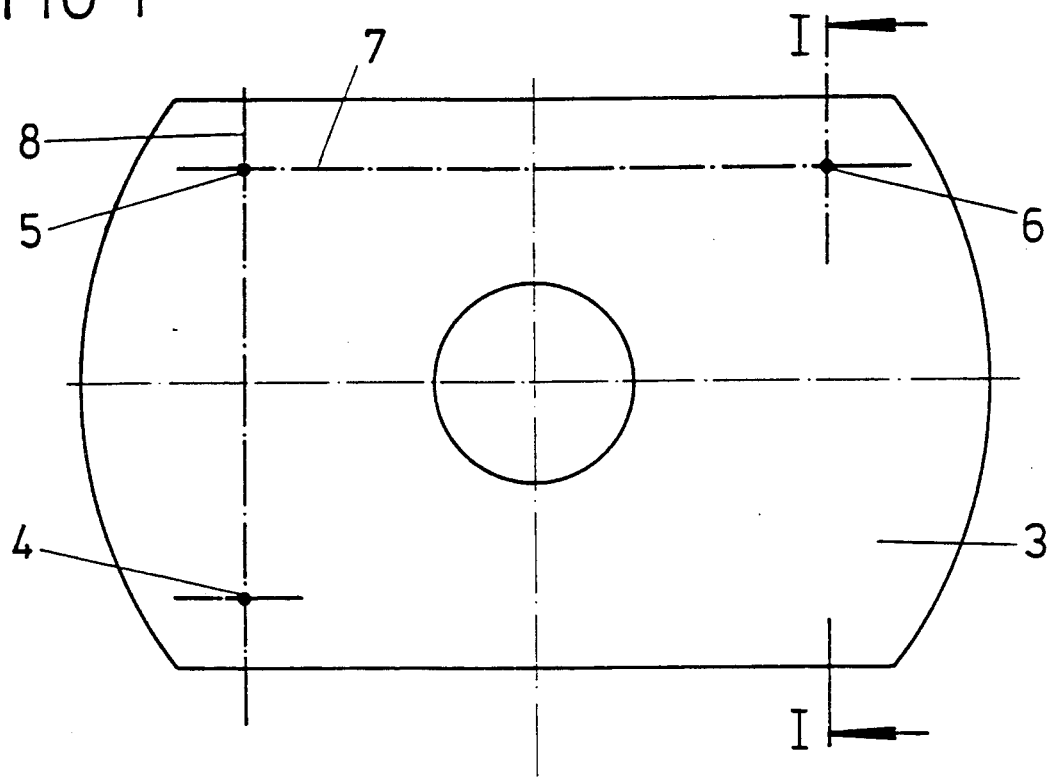
FIG. 1 is a front elevational view of a reflector of a headlamp.

A headlamp has an envelope formed of a housing 1 and a transparent light shield 2 which are sealingly joined together. The envelope formed of the housing 1 and the transparent light shield 2 sealingly enclose a reflector 3 which is mounted therein. In this regard, the reflector 3 is supported by the housing 1 namely at point supports 4, 5 and 6. Point support 5 is formed as a fixed, not adjustable, support, while the point supports 4 and 6 are adjustable supports. The adjustable support 6 is shown in more detail in FIGS. 2 and 3. Adjustment of the reflector about a horizontal axis 7 results from movement of the adjustable support 4 and adjustment of the reflector 3 about an axis 8 results from movement of the adjustable support 6. The adjustable support 4 is constructed to be identical with the adjustable support 6 of FIG. 2.

Each of the adjustable supports 4 and 6 comprises mainly a threaded nut 9 serving as an intermediate piece 9 which has a ball head 10 pivotally mounted in a receiving socket 11 of the reflector 3. An externally threaded shaft 12 is screwed into the internally threaded nut 9 and a free end portion 13 thereof extends out of the housing 1. An adjusting wheel 14 is mounted on this end portion 13 of the threaded shaft 12, affixed thereto both in a rotational as well as in an axial sense. By turning the adjusting wheel 14, the threaded shaft 12 will be screwed into and out of the threaded nut intermediate piece 9 so that the reflector 3 is adjusted about the axis 8.

Figure 5:
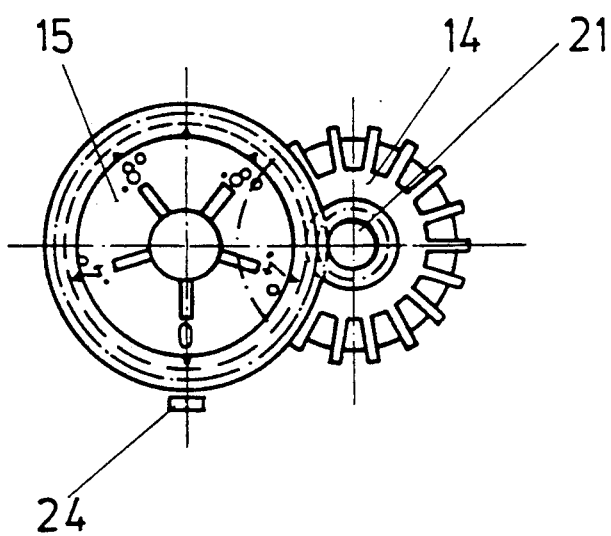
FIG. 5 is a view taken in direction Y in FIG. 4.
Figure 3:
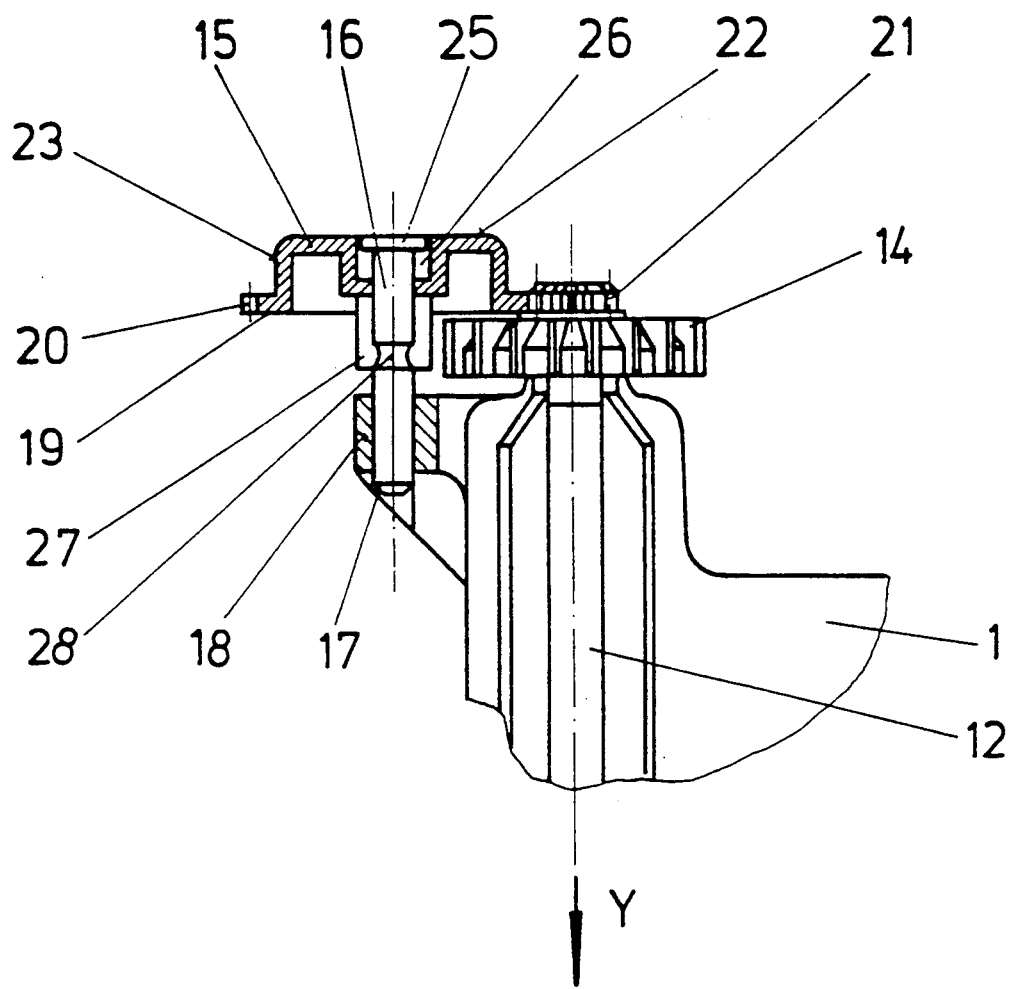
FIG. 3 is a segmented, partially cutaway, view of a portion of the headlamp of FIG. 2 taken from direction X in FIG. 2.
Figure 4:
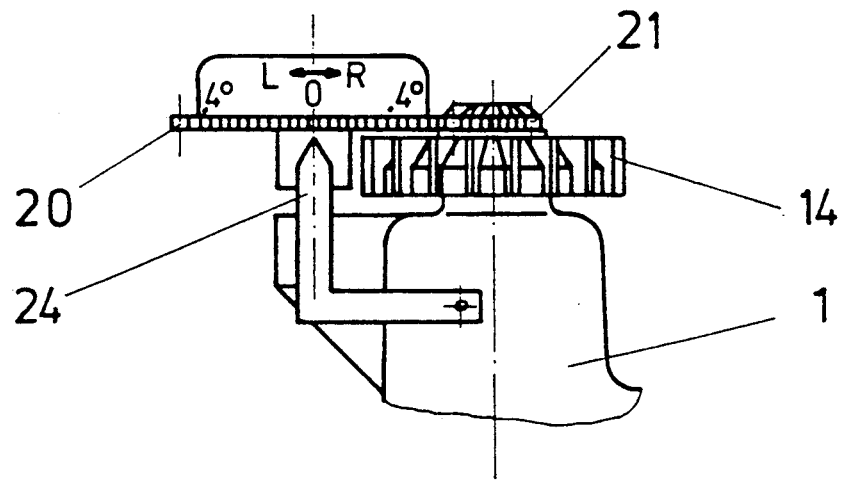
FIG. 4 is a segmented view similar to that of FIG. 3, however, it is not cut-away.

In order to recognize, or read, the position of the reflector relative to the rotational axis 8, the adjustable support 6 is provided with an indicating mechanism which is shown in more detail in FIGS. 3, 4 and 5.

The indicating mechanism comprises mainly a toothed wheel 15 which is rotatably mounted on an axle 16 which, in turn, has an end portion 17 that is pressed fitted into a flange socket 18 of the stationary housing 1. In this regard, the end portion 17 of the axle 16 is knurled thereat. The toothed wheel 15 is hollowed out, or open, on one side and has an outer edge 19 which projects outwardly to form a toothed flange 20. The toothed flange 20 of the toothed wheel 15 meshes with, or engages, with a pinion gear 21 which is formed of a resinous plastic as one piece with the adjusting wheel 14. When the adjusting wheel 14 is manipulated, or rotated, the toothed wheel 15 which is free to rotate about the axle 16 is also rotated therewith.

The toothed wheel 15 has a scale, or indicia, on its axial face surface 22 as well as on a circumferential surface 23 which cooperates with a pointer, or indicator, 24 mounted on the housing 1. When the adjusting wheel 14 is rotated, the toothed wheel 15 rotates therewith. After an adjustment of the toothed wheel 15 its zero "0" position no longer corresponds to the pointer 24. Because after an adjustment of the toothed wheel 15 its "zero" (0) position indicia no longer corresponds to the position of the pointer 24, it can be recognized that an adjustment of the reflector 3 was conducted or has unintentionally occurred. Thus, it is recognizable that the reflector is in an incorrect position in its horizontal plane, that is, about its adjustment axis 8, by a simple glance at the indicating mechanism. So that the indicating mechanism for each correct horizontal adjustment of the reflector is newly settable, the toothed wheel 15 can be disengaged from the pinion 21 by shifting, or displacing, it along its axle 16 so that the toothed wheel 15, loosed from meshing engagement with the pinion 21, is rotatable about its axle 16. After the toothed wheel 15 is adjusted to its zero position, that is, so that the "zero" (0) indicia corresponds to the pointer 24, the toothed wheel will again be shifted into meshing engagement with the pinion 21. In order to make possible this axial shifting, or sliding, a flange 25 is provided on a free end of the axle 16 which prevents the toothed wheel 15 from being pulled off of the axle 16. This flange 25 is mounted to be countersunk in an inwardly drawn indentation 26 of the toothed wheel 15. In this regard, the indentation 26 is made sufficiently deep so that a space remains between the flange 25 and a floor of the indentation 26 which is sufficient so that the toothed wheel 15 can be pulled out of mesh with the pinion 21. On an interior side of the toothed wheel, the floor of the indentation 26 includes a cylindrical sleeve 27 which protrudes toward the housing, which defines a plurality of slits therein, and which has an interior bead, or protrusion 27, for elastically engaging a ring groove 28 in the axle 16. In this manner, it is prevented that the toothed wheel 15 alone and unintentionally can loose itself from the position in which it meshes with, or engages, the pinion 21.

A reduction of the pinion 21 to the toothed wheel 15 is 4:1. The thread pitch of the threaded shaft 12 is selected so that four rotations of the adjusting wheel 14 results in a one degree reflector adjustment.

In a further embodiment of the invention, the toothed wheel is mounted on an axle which is mounted in a fixed portion of the headlamp that receives the threaded shaft. Thus, previously known headlamps can be equipped in an uncomplicated manner with an indicator mechanism of this invention and can also be easily retrofitted therefor.

So that the toothed wheel does not unintentionally become disengaged from the pinion, the coaxial sleeve is formed on the toothed wheel, which is of a resinous plastic, having longitudinal slits therein and having an interior bead for elastically engaging into a ring groove of the axle.

Further, it is beneficial that an end of the axle which is press fitted into a fixed part of the headlamp is knurled. This embodiment makes possible an uncomplicated attachment of the axle to the fixed part of the headlamp for providing a secure attachment. In this manner, the position of the toothed wheel relative to the pinion can be exactly set by forcing the axle into its mount to a greater depth or a lesser depth.

It is useful that the toothed wheel is constructed to be hollow, or open, on one side with an outer edge protruding outwardly and forming a toothed rim. In this manner, it is possible to place an indicia scale on a perimeter, or radial, edge, or rim, of the toothed wheel without the necessity of increasing the wall strength of the toothed wheel. So that a flange at an end of the toothed-wheel axle does not extend far outside of the toothed wheel, a floor of the cup shaped toothed wheel has an inwardly drawn indentation in which the flange formed on the axle is countersunk.

To simplify manipulation of the adjusting device an adjusting wheel is fixedly mounted on the threaded shaft between the pinion of the threaded shaft and the fixed part of the headlamp on which the threaded shaft is mounted which serves for hand manipulation the threaded shaft. In this regard, the pinion is formed as one piece with the adjusting wheel of a resinous plastic. This has the benefit that the normal parts of the adjusting mechanism, when the indicating mechanism is used, up to the adjusting wheel, do not need to be changed and thereby a relatively easy retrofit of a headlamp with the indicating mechanism is possible.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined as follows:

1. In a headlamp for motor vehicles of a type including an adjusting device for pivoting a reflector at least about one axis, wherein the adjusting device comprises a threaded nut mounted on the reflector and a threaded shaft mounted on a stationary part of the headlamp to be rotatable thereon but not substantially moveable in an axial direction, and wherein the adjusting device includes a scale type indicating mechanism which shows the position of the pivotable reflector, with said indicating mechanism comprising a fixed part and a movable part;

the improvement wherein the moveable part of the indicating mechanism is a loose idling toothed wheel which meshes with a pinion mounted on the threaded shaft, said toothed wheel being moveable axially for disengagement thereof, from said pinion.

2. In a headlamp according to claim 1 wherein said toothed wheel is mounted on an axle which is inserted into the stationary part of the headlamp holding the threaded shaft.

3. In a headlamp according to claim 2 wherein the toothed wheel is made of plastic and includes a coaxial sleeve which is longitudinally slit and which has an internal bead for elastically engaging a ring groove of the axle.

4. In a headlamp according to claim 2 wherein an end of the axle engaged with the stationary part of the headlamp is press fitted thereto and is knurled thereat.

5. In a headlamp according to claim 1 wherein the toothed wheel is formed to be open, or hollow, on one side with an outer rim extending outwardly and formed as a toothed flange.

6. In a headlamp according to claim 5 wherein the toothed wheel is cup shaped to have an indentation therein and wherein said axle includes a flange which is receivable in the indentation.

7. In a headlamp according to claim 1 wherein an adjusting wheel is mounted on the threaded shaft between the pinion of the threaded shaft and the receiving stationary part of the headlamp to be manipulated by hand for rotating the threaded shaft.

8. In a headlamp according to claim 7 wherein the pinion is formed as one piece of a resinous plastic with the adjusting wheel.

9. In a headlamp according to claim 1 wherein the toothed wheel includes an indicia scale and the fixed part of the headlamp includes an indicator thereon.

10. In a headlamp according to claim 1 wherein the toothed wheel is made of plastic and includes a coaxial sleeve which is longitudinally slit and which has an internal bead for elastically engaging a ring groove of the axle.

* * * * *